United States Patent
Paakkinen

(10) Patent No.: US 9,777,700 B2
(45) Date of Patent: Oct. 3, 2017

(54) GYRATING WAVE POWER PLANT

(71) Applicant: Wello Oy, Espoo (FI)

(72) Inventor: Heikki Paakkinen, Espoo (FI)

(73) Assignee: WELLO OY, Espoo (FI)

( * ) Notice: Subject to any disclaimer, the term of this patent is extended or adjusted under 35 U.S.C. 154(b) by 0 days.

(21) Appl. No.: 14/913,677

(22) PCT Filed: Sep. 17, 2014

(86) PCT No.: PCT/FI2014/050709
§ 371 (c)(1),
(2) Date: Feb. 22, 2016

(87) PCT Pub. No.: WO2015/040277
PCT Pub. Date: Mar. 26, 2015

(65) Prior Publication Data
US 2016/0201640 A1 Jul. 14, 2016

(30) Foreign Application Priority Data

Sep. 18, 2013 (FI) ...................................... 20135937

(51) Int. Cl.
*F03B 13/14* (2006.01)
*E02B 9/08* (2006.01)
(Continued)

(52) U.S. Cl.
CPC ................ *F03B 13/14* (2013.01); *E02B 9/08* (2013.01); *F03B 13/20* (2013.01); *F03B 13/22* (2013.01);
(Continued)

(58) Field of Classification Search
CPC .. F03B 13/22; F05B 2240/95; F05B 2240/97; F05B 2250/14; F05B 2250/31; F05B 2250/71; Y02E 10/38
(Continued)

(56) References Cited

U.S. PATENT DOCUMENTS

| 4,352,023 A | 9/1982 | Sachs et al. |
| 2012/0119500 A1 | 5/2012 | Christopher |

FOREIGN PATENT DOCUMENTS

| JP | 2001-193626 A | 7/2001 |
| SU | 1341375 A1 | 9/1987 |

(Continued)

OTHER PUBLICATIONS

International Search Report of International Application No. PCT/FI2014/050709, date of mailing Dec. 4, 2014.
(Continued)

*Primary Examiner* — Jorge Leon, Jr.
(74) *Attorney, Agent, or Firm* — Knobbe Martens Olson & Bear LLP

(57) ABSTRACT

A gyrating wave power plant, comprising a body (1) floating on water with a main plane which in calm water is substantially vertical. The body is moored in an orientation with the main plane transverse to the propagation direction of waves. The body has its upper and lower sections provided with arched fins (2, 3). The fins (2) in the body's upper section curve downward when proceeding towards side edges of the body, and the fins (3) in the body's lower section curve upward when proceeding towards side edges of the body. The arched shape of the fins (2, 3) is an oval-shaped spiral with respect to a lateral swaying axis (A) of the body, which is perpendicular to the main plane.

11 Claims, 3 Drawing Sheets

(51) Int. Cl.
*F03B 13/20* (2006.01)
*F03B 13/22* (2006.01)

(52) U.S. Cl.
CPC ....... *F05B 2240/95* (2013.01); *F05B 2240/97* (2013.01); *F05B 2250/14* (2013.01); *F05B 2250/31* (2013.01); *F05B 2250/71* (2013.01); *Y02E 10/38* (2013.01)

(58) Field of Classification Search
USPC ................................ 60/497, 502; 290/42, 53
See application file for complete search history.

(56) References Cited

FOREIGN PATENT DOCUMENTS

| WO | WO 2008/006145 A1 | 1/2008 |
| WO | 2010034888 | 4/2010 |
| WO | WO 2014/001627 A1 | 1/2014 |

OTHER PUBLICATIONS

Written Opinion for International Application No. PCT/FI2014/050709, dated Dec. 3, 2014.
Finish Search Report dated May 16, 2014 in 1 page.
Extended European Search Report issued Mar. 30, 2017 in corresponding EP Application No. 14846106.4.

GYRATING WAVE POWER PLANT

CROSS REFERENCE

This application is a U.S. National Phase of PCT International Application No. PCT/FI2014/050709, filed Sep. 17, 2014 and which claims priority benefit of Finnish Patent Application No. FI 20135937 filed on Sep. 18, 2013. The entirety of each of the above-identified applications is hereby incorporated by reference.

BACKGROUND

The invention relates to a gyrating wave power plant, comprising a body floating on water with a main plane which in calm water is substantially vertical, the body being moored in an orientation with the main plane transverse to the propagation direction of waves.

It is prior known from the Applicant's earlier patent applications WO 2008/119881 and WO 2010/034888 to set the body of a wave power plant in a gyratory motion, which refers to a type of motion in which the wave power plant has the inclination angle of its vertical axis rotating around a theoretical vertical axis. A human body performs a similar type of gyratory motion when spinning a hula hoop. Such a gyratory motion is particularly beneficial in comparison with a back-and-forth swinging motion as the power takeoff mechanism is continuously subjected to a rotative moment. In back-and-forth motion, on the other hand, the rotative moment is just occasional (twice during a revolution), making it impossible to achieve a continuous rotation of the mechanism in shifting wave conditions.

It is an objective of the invention to provide an improved wave power plant, which enables the generation of a gyratory motion as pure as possible for the wave power plant's body and energy production as consistent as possible even in irregular wave. In other words, it is an object of the invention to improve the output capacity and operating capabilities of a wave power plant also in changing wave conditions.

This objective is attained with a wave power plant of the invention on the basis of features presented in the appended claim 1. Preferred embodiments of the invention are presented in the dependent claims.

Thus, a discovery in the invention is the creation of capabilities for the body's main plane to perform its tilting simultaneously both in a direction perpendicular to the main plane and co-directionally with the main plane, the hybrid movement generating a gyratory motion.

In addition, the invention facilitates the utilization of a merit of the Applicant's earlier patent application PCT/FI2013/040502, wherein the tilting motion and horizontal accelerations come together at such a stage that the moments of inclination/gravitation and acceleration enhance each other. If desired, it is also possible to make use of the moment of gyro force.

The wave power plant of the invention produces power with high efficiency and at a fairly consistent rate regardless of the wave size as the dimensions length/height of mostly occurring typical natural waves are more or less constant.

In the solution according to the invention, the so-called 'pitch' motion or jolting occurs in a direction opposite to the inclination of a wave surface. Therefore, the wave power plant's body and, hence, the rotator's shaft swing towards the wave. The jolting occurring in the wave propagation direction results from the internal movement of water. In the invention, the constant tilting of a floating body is brought about in the way of deviating from the direction of a wave surface by means of intra-wave currents applied to a submerged portion of the body. This submerged portion of the body extends to such a depth that the currents (horizontal) of various speeds present inside the wave can be effectively brought to induce longitudinal tilting motions of the body.

A large panel type surface makes highly effective use of the horizontal motion of a wave over most of the sphere of influence of the wave. In the case of a small wave, the wave becomes utilized over its entire sphere of influence. In vertical direction, the device reaches a depth equal to where wave motion exists.

By always tilting towards a wave, the body has its inclination moment and its acceleration moment enhancing each other. Thus, the body is forced to perform a gyratory motion, because the horizontal movements of water generate heaving motions of the body's plane simultaneously with lateral tilting induced by arranging and designing the fins according to the invention. The gyration generated by crosswise tilting motions is related to the wave at a beneficial stage and the gravitational action performance of a rotator is enhanced by horizontal acceleration.

In the wave power plant according to a preferred embodiment of the invention, the rotator appropriate for gravitational power takeoff can be substantially lighter than e.g. in the wave power plant presented in the publication WO2010/034888, because some of the rotator torque can be produced by spin angular momentum. A particularly significant benefit with respect to prior known wave power plants is attained by the invention for the reason that the moments caused by inclination and acceleration become summed up with each other for a dead weight torque.

Having the body designed as a vertical or slanting wall submerged to a sufficient depth, it is possible, by making use of intra-wave currents, that the body be provided with such a stage in terms of its constant tilting that the moment caused by horizontal acceleration can also be exploited, which is not possible with bodies whose floating is determined by the direction of a wave surface. By virtue of fins designed and arranged according to the invention, there is further obtained effective lateral tilting generated by vertical currents in a correct phase with respect to longitudinal tilting. This results in a benefit of obtaining a torque as consistent and effective as possible for the duration of an entire cycle.

One exemplary embodiment of the invention will now be described even more precisely with reference to the accompanying drawings, in which.

The wave power plant depicted in the figures comprises a body 1 floating on water, having a main plane which in calm water is substantially vertical. The main plane refers here to such a plane of the body in which the body generates the most powerful flow resistance for a current arriving in a direction perpendicular thereto. The body 1 comprises a wall which is vertical, i.e. co-directional with the main plane, and from both lateral surfaces of which protrude fins 2, 3, several of which are spaced from each other both in a lower section of the body and in an upper section of the body. The body 1 is moored by its lower section in an orientation, wherein the body has its main plane transverse to the propagation direction of waves.

The fins 2, 3 protruding from the main plane of the body 1 are arched in such a way that the fins 2 in the body's upper section curve downward when proceeding from a midsection towards side edges of the main plane, and the fins 3 in the body's lower section curve upward when proceeding from the body's midsection towards side edges of the main plane. A particularly preferred shape for the fins is an oval-shaped spiral with respect to the axis of lateral swaying, the latter being perpendicular to the main plane. Reasons for this shape of the fins will be explained later. An arched reinforcement 4 skirting around the body 1 has also an oval-shaped spiral form.

Figure 2:
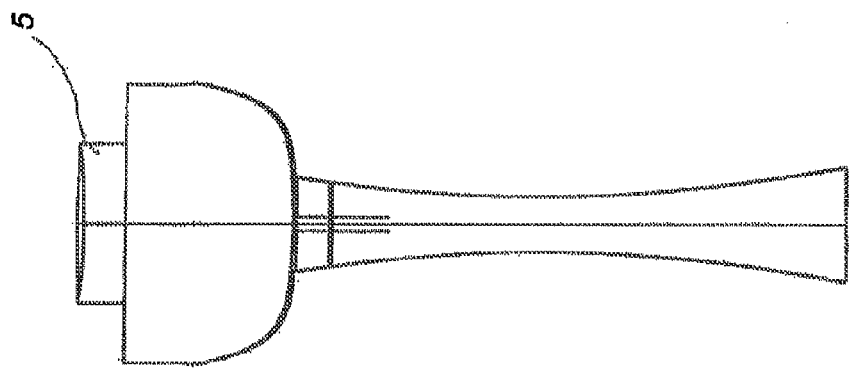
FIG. 2 shows the wave power plant of FIG. 1 in a view co-directional with the main plane.
Figure 1:
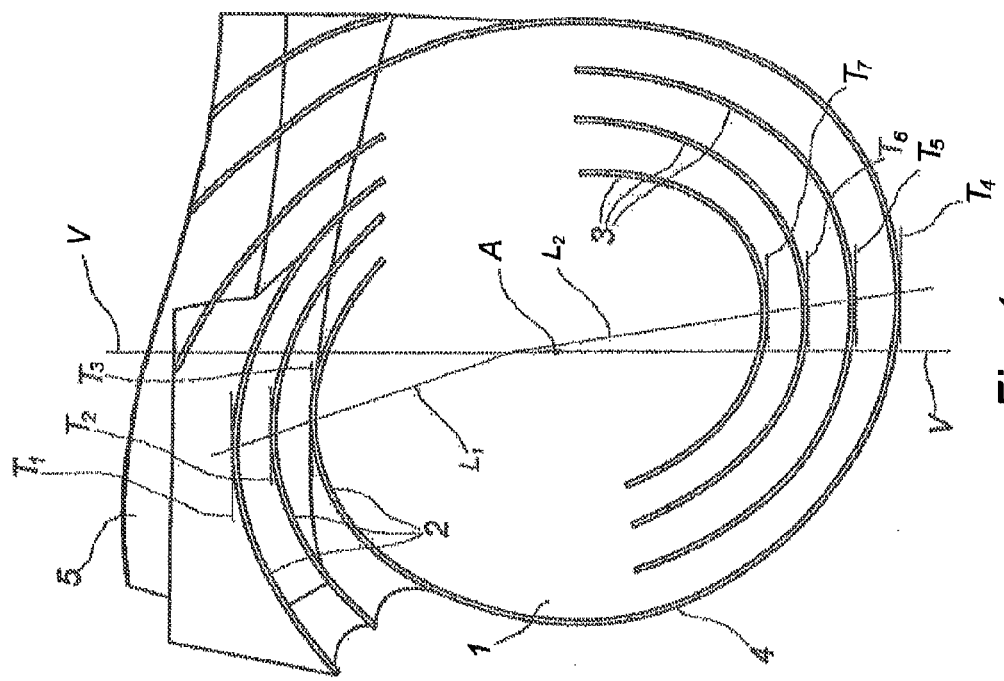
FIG. 1 shows a wave power plant according to a preferred embodiment of the invention in a side view (in a direction perpendicular to the main plane)
Figure 3:
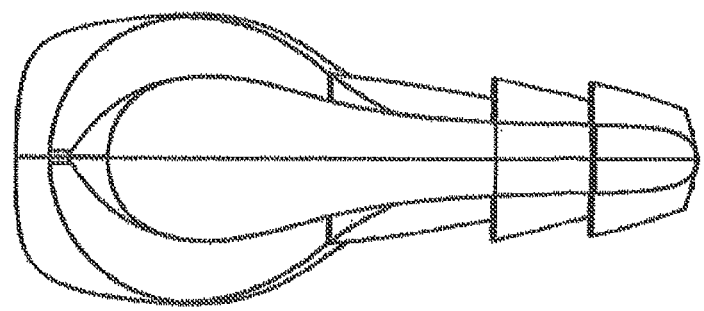
FIG. 3 shows the wave power plant of FIG. 1 in a plan view and FIG. 4 shows the same wave power plant in a perspective view obliquely from above.
Figure 4:
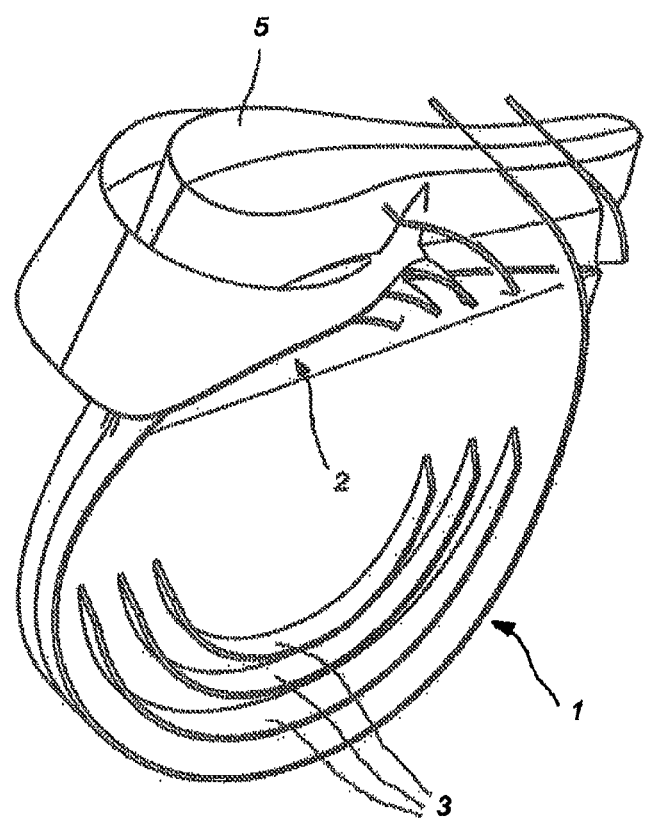

As indicated with lines V, T1-T7, L1 and L2 drawn in FIG. 1, the upper fins 2 have the horizontal tangents T1-T3 of their arcs touching the upper fins at points which are on one side of a vertical line V extending through the body's midsection, while the lower fins 3 have the horizontal tangents T4-T7 of their arcs touching the lower fins at points which are on the other side of said vertical line V. In the illustrated case, lines L1 and L2 extending by way of said touching points establish an acute angle with the vertical line V extending through the midsection. The wave power plant has its driving gear 5 above the arched upper fins 2, preferably on the same side of the body's midsection vertical line V as the touching points of the upper fins and the horizontal tangents thereof.

As further shown in FIG. 1, the arched shapes of upper and lower side fins complement each other to establish an oval spiral. However, the fins are absent or smaller in size (less protruding) in a midsection of the body's height, because there the effect of fins on generating gyratory motion is slight or nearly nonexistent.

Reasons will now be presented for why the fins 2, 3 are arched as described, specifically in the shape of an oval spiral.

Figure 5:
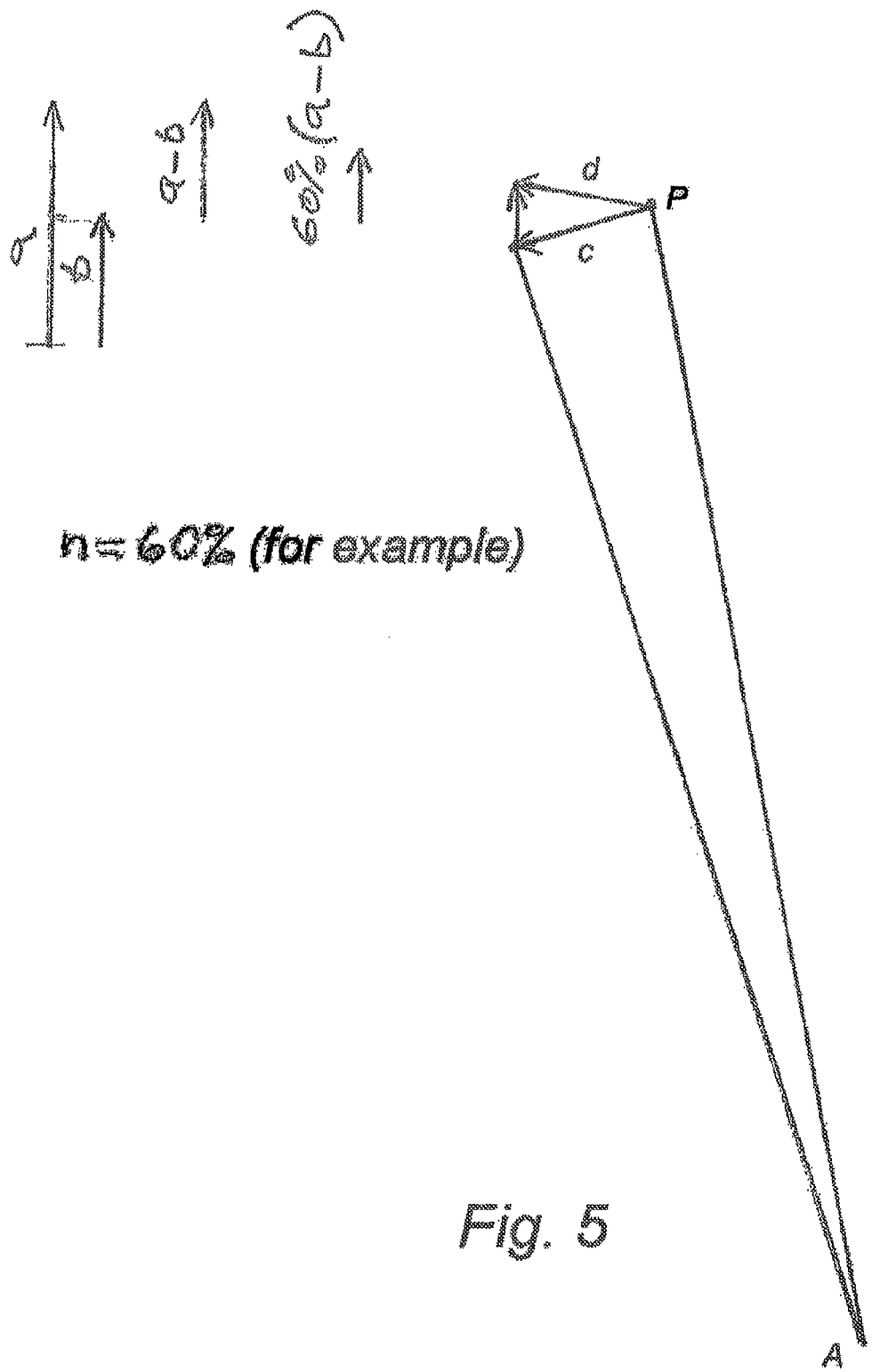
FIG. 5 shows a schematic view for defining a direction d for a spiral oval-shaped fin at a specific point P.

In reference to FIG. 5, there is considered one theoretical way of determining the direction of a fin at each point P on various sides of the body. The vertical movement of a wave is exploited in such a way that the device is allowed to heave along with the wave (slightly less than half of a total wave movement). Thus, in an upper part of the device, the water particles pull the upper fins of the device in the direction of a wave movement (alternately in up and down directions). In a lower part of the device, the water particles oppose the up-down movement of the device and thereby push the lower fins in a direction opposite to the (vertical) movement of a wave. In the proximity of the midsection of the device there is a neutral level (and a neutral point/swaying axis A), at which the device and the water particles keep shifting in the same direction and to the same extent (in vertical direction).

This is taken into account in an equation below in such a way that from the movement of a water particle at the depth of a monitoring point is subtracted the movement of a water particle at the neutral level (a-b).

The equation can be written by using vectors representing an amplitude (can be optionally also written with speeds).

$a$=amplitude of vertical water particle movement at the level of monitoring point $P$ (straight line up)

$b$=amplitude of vertical wave motion at neutral level (straight line up)

$c$=(selected) amplitude of body swaying at monitoring point (movement around swaying axis $A$)

$d$=vector parallel to a fin=direction of a fin at monitoring point

If no power were taken off the device and if there were no friction, the equation would be:

$$d=a-b+c$$

Hence, the question is about a resultant of the relative vertical movement of water and the movement of a monitoring point, and particularly the direction of such a resultant.

Since it is desirable to extract power out of the device, the movement of a fin results in collapsing or sliding in relation to the relative (a-b) vertical movement of water (cf. the keel of a sailboat). The correction coefficient for sliding is selected (presumed) to be n %, the relative vertical movement being multiplied by this.

$$d=n\ \%\ (a-b)+c$$

The estimated coefficient n for the effect of sliding/collapsing in vertical movement is in the order of 50 . . . 60% (40 . . . 70%) in the output of maximum power. Hence, the direction of vector d is the direction of a fin at monitoring point P. This direction depends on the extent of sliding and the selected amplitude of a swaying motion. Correct values for these are dependent on the characteristics of a power takeoff mechanism and the body's physical properties (e.g. surface area of the fins, flow resistance, and size of the body). Optimum values can be obtained experimentally.

In addition to having a shape advantageous for generating lateral swaying, neither do the fins significantly oppose lateral swaying of the body.

The invention claimed is:

1. A gyrating wave power plant, comprising a body floating on water with a main plane which in calm water is substantially vertical, the body being moored in an orientation with the main plane transverse to the propagation direction of waves, wherein the body has upper and lower sections provided with arched fins, such that upper fins in the body's upper section curve downward when proceeding towards side edges of the body, and lower fins in the body's lower section curve upward when proceeding towards side edges of the body.

2. A wave power plant according to claim 1, wherein the arched fins form an oval-shaped spiral with respect to a lateral swaying axis of the body, which is perpendicular to the main plane.

3. A wave power plant according to claim 2, wherein a reinforcement arc skirting around the body has also the shape of an oval spiral.

4. A wave power plant according to claim 1, wherein the body comprises a vertical wall having lateral surfaces, from which protrude a plurality of said fins spaced from each other both in the lower section and in the upper section of the body.

5. A wave power plant according to claim 1, wherein, as a result of a combination of said fins, mooring of the body, and the waves has an effect of forcing the body to perform a gyratory motion, wherein the body's main plane has a vertical axis, which coincides with a theoretical vertical axis when the body is in calm water, continuously revolving in an inclined position around the theoretical vertical axis in waves on whose strength depends on an angle of inclination between the body's vertical axis and the theoretical vertical axis.

6. A wave power plant according to claim 1, wherein the upper and lower fins have areas defining uppermost points of the upper fins and lowermost points of the lower fins and horizontal tangents touching the upper fins at their uppermost points are located on a first side of a vertical line extending through a lateral swaying axis of the body, and horizontal tangents touching the lower fins at their lowermost points are located on a second side of said vertical line.

7. A wave power plant according to claim 6, wherein a line extending by way of said uppermost points establishes an acute angle with said vertical line and a line extending by way of said lowermost points establishes an acute angle with said vertical line.

8. A wave power plant according to claim 6, wherein the wave power plant has a driving gear located on the first side of the vertical line extending through the lateral swaying axis of the body.

9. A wave power plant according to claim 1, wherein the wave power plant has driving gear, whereby gyratory motion is converted into electrical power, located above the upper fins.

10. A wave power plant according to claim 1, wherein the lower fins and the upper fins complement each other to make up an oval-shaped spiral.

11. A wave power plant according to claim 1, wherein the fins are absent or protrude less in a midsection of the body's height, in a section between the upper fins and the lower fins.

\* \* \* \* \*